United States Patent [19]

Kuhlman

[11] Patent Number: 4,956,939
[45] Date of Patent: Sep. 18, 1990

[54] RELEASABLE CONNECTOR FOR CLOSURE OPERATING MECHANISM

[75] Inventor: Howard W. Kuhlman, Troy, Mich.

[73] Assignee: General Motors Corporation, Detroit, Mich.

[21] Appl. No.: 386,748

[22] Filed: Jul. 31, 1989

[51] Int. Cl.⁵ ............................................. E05F 11/04
[52] U.S. Cl. ......................................... 49/347; 49/26; 49/280; 49/301; 24/602; 24/667
[58] Field of Search .................. 49/347, 26, 301, 280; 24/666, 667, 668, 701, 602, 115 F

[56] References Cited

U.S. PATENT DOCUMENTS

| | | | |
|---|---|---|---|
| 1,930,603 | 9/1932 | White | 24/667 |
| 3,540,089 | 3/1968 | Franklin | 24/602 |
| 4,850,140 | 7/1989 | Compeau | 49/347 |

*Primary Examiner*—Gary L. Smith
*Assistant Examiner*—Jerry Redman

*Attorney, Agent, or Firm*—Charles E. Leahy

[57] ABSTRACT

A releasable connection device for connecting a motor driven drive cable to a closure includes a pin attached to the closure and having a spherical head. A housing member connected to the cable has an elongated slot formed in a lateral wall and receiving the spherical head of the pin. A ramp surface formed on the housing member at the end of the elongated slot furthest from the cable is engaged by the head of the pin. A spring clip mounted on the housing member has opposed spring arms which encircle the spherical head to retain the head of the pin in the elongated slot of the housing member to connect the motor driven drive element and the vehicle body closure. The spring arms yield in response to a predetermined level of forced imposed thereon by the spherical head of the pin so that the pin is ejected laterally through the opening to disconnect the drive element from the closure.

3 Claims, 2 Drawing Sheets

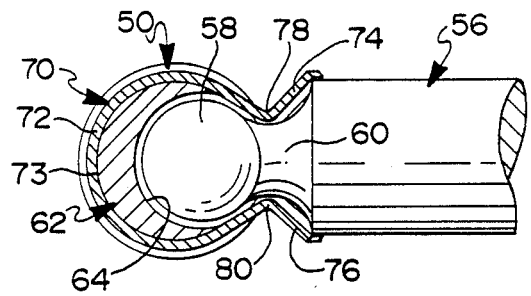
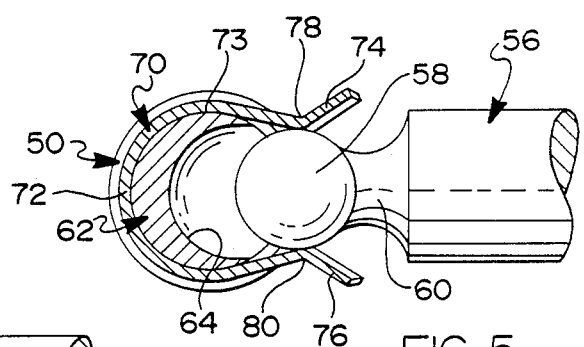
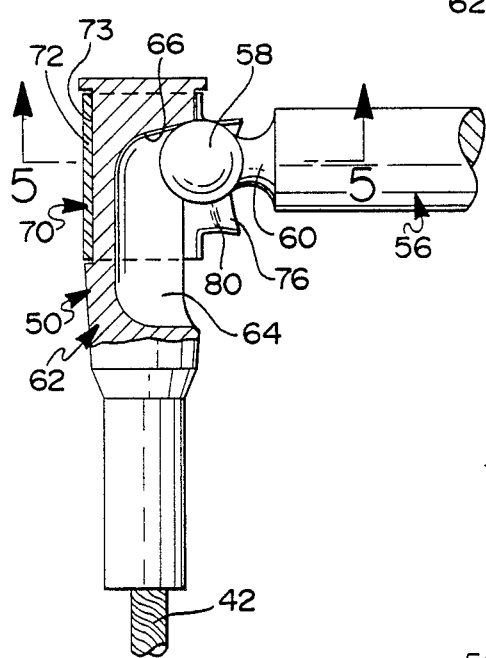
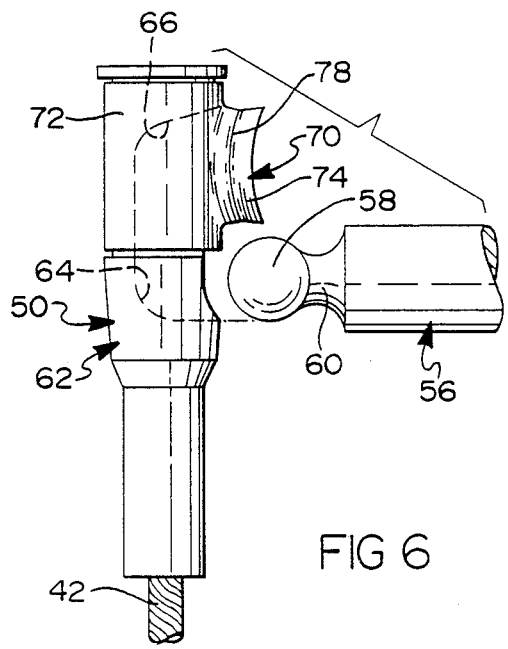
FIG 3
FIG 5
FIG 4
FIG 6

RELEASABLE CONNECTOR FOR CLOSURE OPERATING MECHANISM

The invention relates to a motor driven operating mechanism for closing a vehicle body closure and more particularly provides a releasable connector releasing the closure from the motor drive upon obstruction of the closure or upon forced entry.

BACKGROUND OF THE INVENTION

It is known in vehicle bodies to provide a mechanism for moving a vehicle body closure between the open and closed positions.

One such mechanism is shown in United States Pat. No. 4,869,537 issued Sept. 26, 1989; and assigned to the assignee of this invention. Such a vehicle closure operating mechanism includes a motor driven cable drum which winds and unwinds a cable. The end of the cable is attached to the vehicle body closure so that winding of the cable on the drum will forcibly pivot the closure to the closed position.

U. S. Pat. No. 4,850,140 issued July 25, 1989; provided an energy absorbing and releasable connector for releasing the closure from the motor drive upon obstruction of the closure or forced entry.

It would be desirable to provide an improved releasable connection between the cable and the closure so that continued winding of the cable after the closure encounters an obstruction would permit the cable to release from the closure, thereby preventing injury to the closure or the closure operating mechanism It would also be desirable to provide an improved releasable connection device which would release the cable from the closure in the event that the closure is forcibly moved to the open position by a manually applied effort instead of by unwinding the cable.

SUMMARY OF THE INVENTION

According to the invention a releasable connection device for connecting a motor driven drive cable to a closure includes a pin attached to the closure and having a spherical head supported by a necked down stem. A housing member is connected to the cable and has an elongated slot formed in a lateral wall thereof and receiving the spherical head of the pin. A ramp surface is formed on the housing member at the end of the elongated slot furthest from the cable and is engaged by the head of the pin upon imposition of force on the housing member by the cable so that the force imposed is resolved by the engagement between this spherical head and the ramp surface in the direction to urge the head of the pin laterally outward of the elongated slot. A spring clip is mounted on the housing member and has opposed spring arms which encircle the spherical head and seat in the necked down stem of the pin to retain the head of the pin in the elongated slot of the housing member to thereby effect a connection between the motor driven drive element and the vehicle body closure The spring arms yield in response to a predetermined level of forced impose thereon by the spherical head of the pin so that the pin is permitted to be ejected laterally through the opening to effectively disconnect the drive element from the closure. The housing member may be reassembled to the pin by entering the spherical head into the elongated slot at the end distant from the ramp surface and then shifting the housing member to insert the stem of the pin between the spring arms of the spring clip.

BRIEF DESCRIPTION OF THE DRAWINGS

These and other features, objects and advantages of the invention will become apparent upon consideration of the description of the preferred embodiment and t appended drawings in which:

FIG. 3 is a view taken in the direction of arrows 3—3 of FIG. 2;

FIG. 4 is a view similar to FIG. 2 but showing the releasable connecting device in the act of disconnecting the drive cable from the closure panel;

FIG. 5 is a section view taken in the direction of arrows 5—5 of FIG. 4; and

FIG. 6 is a view showing the releasable connecting device in the act of being reconnected to re-establish the connection between the drive cable and the closure panel.

DESCRIPTION OF THE PREFERRED EMBODIMENT

Figure 1:
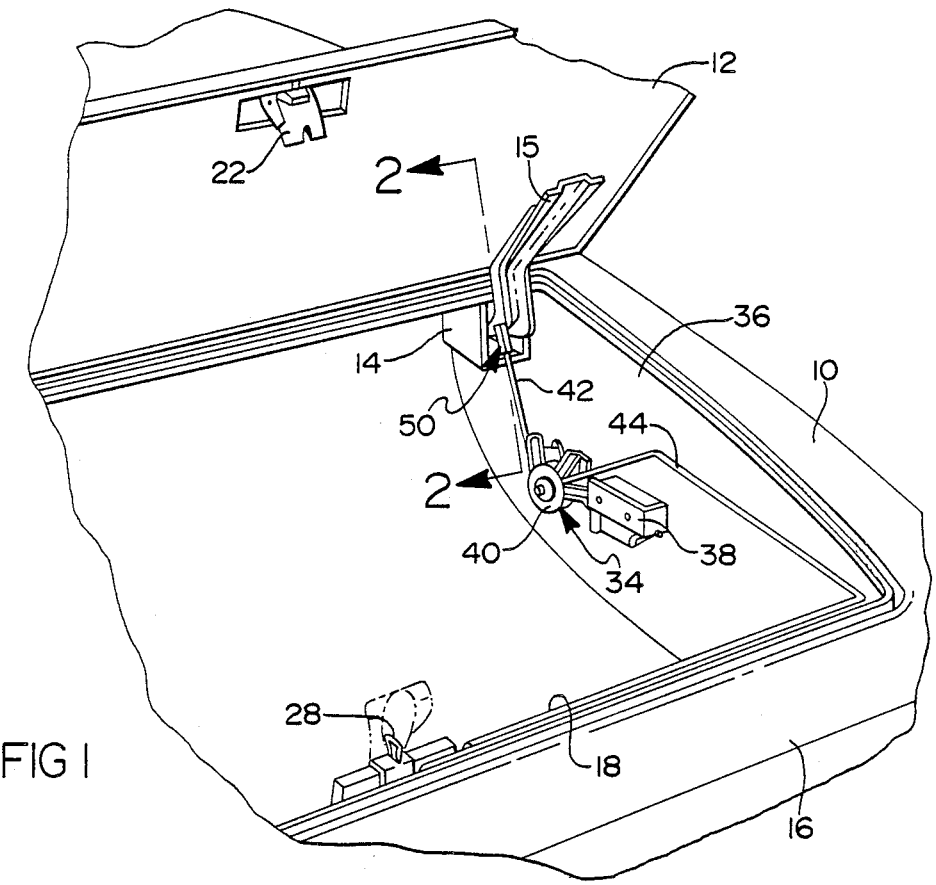
FIG. 1 is a perspective view of a vehicle body having a drum wound cable attached to the deck lid closure hinge by the releasable connecting device of this invention.

Referring to FIG. 1 a deck lid closure 12 is mounted on a vehicle body 10 by a pair of hinges, one of which is shown at 14 and includes a hinge arm 15. Body panel 16 of the vehicle body 10 defines a compartment opening 18 which is opened and closed by the closure 12. A spring, not shown, urges the closure 12 to the open position shown in FIG. 1. The closure 12 may be latched in a closed position by a latch assembly 22 mounted on the closure 12. The latch assembly 22 includes a latch bolt which is engageable with a striker 28 carried by the body panel 16 to latch and interconnect the closure 12 with the body panel 16. The latch assembly 22 also includes a key operated lock cylinder which is rotatable to unlatch the latch bolt from the striker 28 and enable the closure panel 12 to be moved to its FIG. 1 open position by the closure spring.

A motorized drive unit, generally indicated at 34, is provided to pull the closure 12 downwardly to latch the latch assembly 22 with the striker 28, and to also pull the striker 28 down to seal the closure 12 at its fully closed position This motorized drive unit 34 is mounted on the side wall structure 36 of the vehicle body 10 and includes a motor 38 which reversibly rotates a cable drum 40. The cable drum 40 winds and unwinds a cable 42 connected to the closure 12 and a cable 44 connected to the striker 28.

Reference may be had to patent application Ser. No. 143,779 for a complete description of the construction and sequence of operation of the closure operating mechanism, including the latch 22, the striker 28 and the motorized drive unit 34. For purposes of the present invention, it will be understood that the motor 38 rotates cable drum 40 in a direction to wind the cable 42 so that the closure panel 12 is pivoted downwardly to its closed position. In the event that an obstruction blocks the downward pivoting movement of the closure 12, the cable 42 may experience an excessive tension. Furthermore, in the event that the operator attempts to forcibly open the closure 12 against the winding effort of the motor 38 retracting the cable 42, the cable 42 may experience an excessive tension.

Figure 2:
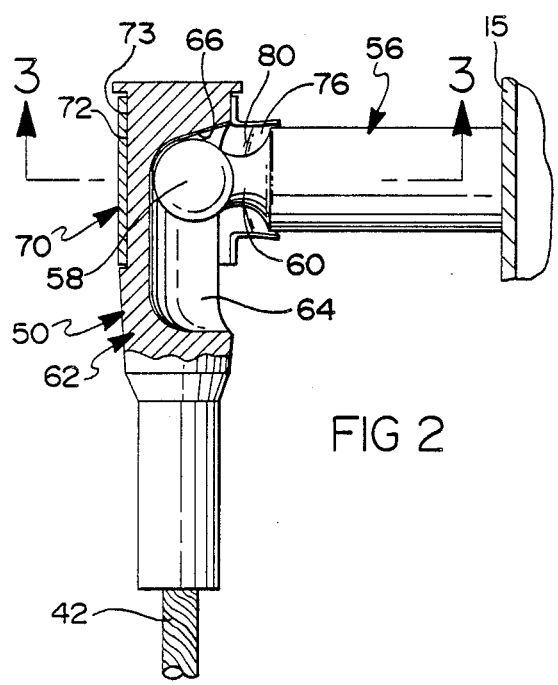
FIG. 2 is a sectional view taken in the direction of arrows 2—2 of FIG. 1 and having parts broken away in section to show the construction of the releasable connecting device.

Referring to FIGS. 2 and 3, a releasable connecting device 50 is provided for connecting the cable 42 with the hinge arm 15 of closure hinge 14.

A pin 56 is attached to the hinge arm 15 and includes a spherical head 58 mounted on a necked down stem 60. The pin 56 extends laterally from the hinge arm 15. A cylindrical housing 62 is swaged or otherwise suitable attached to the cable 42. The housing 62 has an elongated slot or opening 64 which is cut into the side of the housing. As best seen in FIG. 3 the slot 64 has a hemispherical shape which closely receives the spherical head 58 of pin 56.

As best seen in FIG. 2, the end of the elongated slot 64 furthest from the cable 42 is angularly inclined to provide a ramp surface 66 which faces laterally outward toward the pin 56 and is engaged by the spherical head 58 of the pin 56.

A spring clip 70 is carried by the housing 62 and engages with the pin 56. As best seen in FIGS. 2 and 3, the spring clip 70 includes a tubular portion 72 which snaps into a recess 73 in the outer diameter of the cylindrical housing 62 and has opposed facing spring arms 74 and 76 which engage with the pin 56. In particular, as seen in FIG. 3, the spring arms 74 and 76 have indented portions 78 and 80 which reach around the spherical head 58 and into the necked down stem 60 to prevent the pin 56 from being ejected laterally outwardly from the elongated slot 64 of the housing 62. Furthermore, as best seen in FIG. 2 the spring arms 74 and 76 surround the pin 56 to retain the pin at the one end of the elongated slot 64 as shown at FIG. 2 so that the spherical head 58 is in or near to engagement with the ramp surface 66 of the housing 62.

In operation, it will be understood that the tension effort of the spring clip 70 acting on the pin 56 is sufficient to maintain the housing member 62 in connection with the pin 56. In particular, as the cable 42 is wound up by the motor driven drum 40, the cable 42 pulls the connector device downwardly as viewed in FIG. 1, thereby lowering the closure 12.

In the event that an obstruction is encountered by the closure 12 during its closing movement the tension on the cable 42 is increased. If the tension on the cable exceeds the retention effort of the spring clip 70 the spring clip will yield In particular, as viewed in FIG. 2, it is seen that tension on the cable 42 causes an increase in the force of engagement between the spherical head 58 and the ramp surface 66. This force is resolved in the lateral direction and causes the spherical head 58 to ride up the ramp surface 66 as shown in FIG. 4. Such lateral movement is permitted by the springing apart of arms 74 and 76 as shown in FIG. 5 until the housing 62 and the pin 56 become fully separated from one another.

The connector device will also release from the pin 56 if the vehicle user attempts to forcibly raise the closure 12 without waiting for the cable 42 to be unwound from the drum 40.

It will be appreciated that the connector device 50 may be easily reinstalled upon the pin 56. In particular, as shown in FIG. 6, the housing 62 is aligned with the spherical head 58 offset from the spring clip 70. The connector 62 is then installed on the spherical head 58 with the spherical head 58 entering the end of the elongated slot 64 furthest from the ramp surface 66. Once the spherical head 58 is seated at the bottom of the elongated slot 64, tension is applied to the cable 42 to pull the spring clip 70 around the spherical head 58 so that the indented portions 78 and 80 of the arms 74 and 76 are restored to their position of FIG. 3 surrounding the necked down stem 60.

It will be understood that the force required to disconnect the connector 50 from the pin 56 can be controlled by several variables, including the angle of the ramp surface 66, the diameter of the spherical head 58, the retension force and shape of the spring clip 70, and the friction forces acting between the pin, the ramp surface 66 and the spring clip 70.

Thus it is seen that the invention provides a new and improved releasable connector for a closure operating mechanism.

The embodiments of the invention in which an exclusive property or privilege is claimed are defined as follows:

1. A releasing connection device for attaching a motor driven drive element to a vehicle body closure, comprising:

a pin having a head supported by a necked down stem attached to the closure;

a housing member connected to the motor driven drive element and having an opening in a lateral wall thereof receiving the head of the pin and a ramp surface formed on the housing member and within the opening and being engaged by the head of the pin upon imposition of force on the housing member so that the force imposed is resolved in the direction to urge the head of the pin outwardly of the opening;

and a spring clip immovably mounted on the housing and having yieldable means of one-piece integral construction therewith engaging the head of the pin to retain the pin in the housing member and thereby effect a connection between the motor driven drive element and the vehicle body closure, said spring clip yielding in response to a predetermined level of force imposed whereby the pin is released form the housing member to disconnect the drive member from the closure.

2. A releasing connection device for attaching a motor driven drive element to a vehicle body closure, comprising:

a pin having a spherical head supported by a necked down stem attached to the closure;

a housing member connected to the motor driven drive element and having an opening in a lateral wall thereof receiving the head of the pin and a ramp surface formed on the housing member and within the opening and being engaged by the head of the pin upon imposition of force on the housing member so that the force imposed is resolved in the direction to urge the head of the pin laterally outwardly of the opening;

and a spring clip mounted on the housing and having opposed spring arms encircling the spherical head and seating in the necked down stem to retain the pin in the housing member and thereby effect a connection between the motor driven drive element and the vehicle body closure, said spring arms yielding in response to a predetermined level of force imposed whereby the head of the pin is ejected laterally through the opening in the housing member and the drive element is effectively disconnected from the closure.

3. The apparatus of claim 2 in which the opening is an elongated slot and has an end portion distant from the ramp surface for permitting entry of the spherical head into the opening for insertion between the spring clip arms to reestablish the retention of the spherical head of the pin in the housing member and thereby effect reconnection between the motor driven drive element and the vehicle body closure.

* * * * *